May 19, 1925.  
W. J. STEWART  
1,538,065  
FLOOR AND DROP PAN SUPPORT FOR POULTRY FEEDING BATTERIES  
Filed Jan. 26, 1924

Inventor  
William J. Stewart  
By Dodson & Rae  
Attorneys

Patented May 19, 1925.

1,538,065

UNITED STATES PATENT OFFICE.

WILLIAM J. STEWART, OF CLINTON, IOWA.

FLOOR AND DROP PAN SUPPORT FOR POULTRY-FEEDING BATTERIES.

Application filed January 26, 1924. Serial No. 688,686.

*To all whom it may concern:*

Be it known that I, WILLIAM J. STEWART, a citizen of the United States, residing in the city of Clinton, county of Clinton, and State of Iowa, have invented a certain new and useful Improvement in Floor and Drop Pan Supports for Poultry-Feeding Batteries, of which the following is the specification.

My invention relates to that class of inventions which are set forth in my Patent No. 1,458,736 issued January 12, 1923, and has for its object to greatly facilitate the packing of the batteries when demounted and ready for shipment and has for its further object to materially lessen the amount of labor required in assembling the batteries in the field.

My means of accomplishing the foregoing objects may be more readily understood by reference to the accompanying drawings which are hereunto annexed and are a part of the specification; in which—

Figure 1:
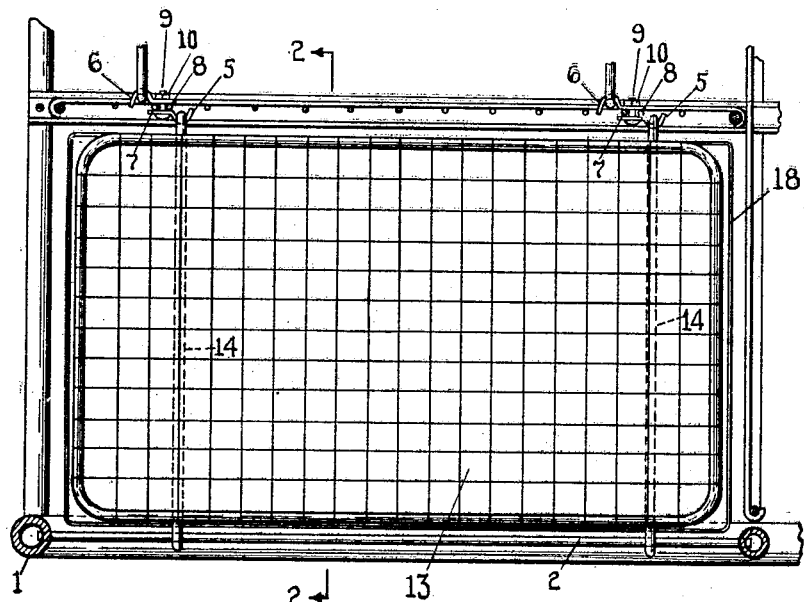
Fig. 1 is a top or plan view of my improved support applied to a battery a portion of the latter only being shown.
Figure 2:
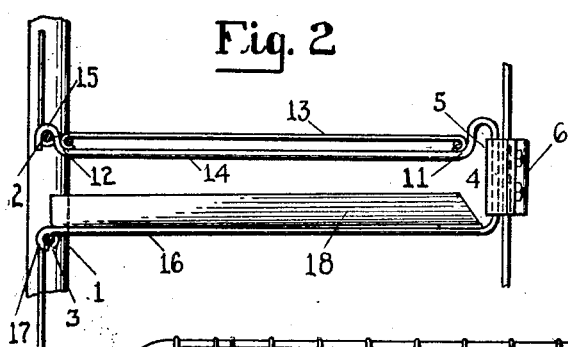
Fig. 2 is a cross section taken on the line 2—2 in Fig. 1.
Figure 3:
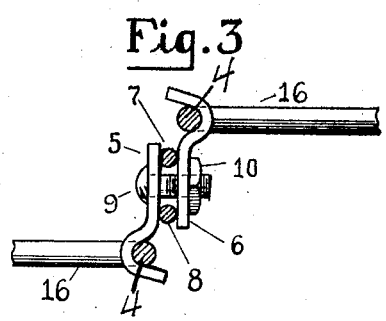
Fig. 3 is an enlarged detail view of the hinge.
Figure 4:
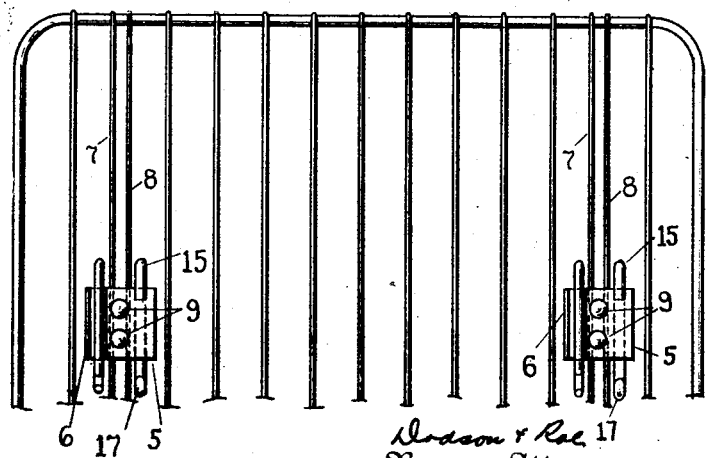
Fig. 4 is a partial view of a partition of a battery showing my supports mounted thereon.

As shown in the drawings a portion of an upright 1 of a battery is shown. This has rods 2 and 3 mounted therein which provides supports for the vertical wires at the top and bottom of the respective channels. My improved support comprises a fork the loop 4 of which is hinged as clearly seen in the detailed view in which the hinge comprises two members 5 and 6 each of which is provided with a U drop adjacent one end in which loop 4 of the fork swings. The hinge is mounted upon two vertical wires 7 and 8 of the partition clearly seen in Fig. 4, a bolt 9 and nut 10 serving to hold the hinge firmly in place. The upper prong 14 which is bent as shown in Fig. 2 at 11 and 12 and thus forms shoulders in which the floor 13 can rest without any danger of its being dislodged. The outer end of the prong 14 is formed into hook 15 which is adapted to be passed over the horizontal rod 2 thus affording a secure support for the floor 13, the lower prong 16 at its outer end 17 is formed into a hook which engages the horizontal rod 3 thus affording strong support for the drop pan 18; this latter being necessarily wider than the floor 13 does not need a shoulder support but rests against the floor panel and its inner edge is held against the loop 4 of the fork.

It will be apparent from the hereinbefore detailed description that it is possible to swing these forks until they are against the partition so that the partitions may be laid one upon another without the floor and pan support interfering in the slightest degree. At the same time the work of mounting the hinge is all done in the factory so that when the battery reaches the field all the assembling that needs to be done is to swing the prongs of the fork out until they engage their respective rods 2 and 3 of the front panels when by hooking the ends 15 and 17 over them the supports will be fixedly held in position without the necessity of the employment of any skilled labor at all.

Although I have shown and described a specific form and construction for my improvement it will be apparent to persons skilled in the art that changes can be made in this construction and the device illustrated is shown solely for disclosing the preferred embodiment of my construction and I do not desire to be understood as limiting myself to the exact details of construction shown and described except as such limitations may appear in the hereinafter appended claims.

1. The combination with a poultry feeding battery having vertical partitions, of a combined floor and drop pan support comprising a two pronged fork the loop of which is hinged to the vertical partition of the battery, the upper prong having a recess formed therein to receive the floor, the lower being adapted to hold the drop pan, hooks formed at the ends of the prongs, members carried by the battery engaged by said hooks.

2. The combination with a poultry feeding battery having vertical partitions, of a combined floor and drop pan support comprising a two pronged fork, the loop of which is hinged to the vertical partition of the battery, the upper prong having a recess formed therein to receive the floor, the lower being adapted to hold the drop pan, hooks formed at the ends of the prongs, members carried by the battery engaged by said hooks.

3. The combination with a poultry feeding battery having vertical partitions, of a combined floor and drop pan support comprising a two pronged fork the loop of which is hinged to the vertical partition of the battery, the upper prong having a recess formed therein to receive the floor, the lower being adapted to hold the drop pan, hooks formed at the ends of the prongs, members carried by the battery engaged by said hooks, means which secures two of said forks to said partition, comprising two members each of which is provided with a U drop adjacent one end in which the loop of the fork is mounted, a bolt and nut which secure the said hinge to the said partition.

WILLIAM J. STEWART.